(12) United States Patent
Otsuka

(10) Patent No.: US 9,665,332 B2
(45) Date of Patent: May 30, 2017

(54) DISPLAY CONTROLLER, SCREEN TRANSFER DEVICE, AND SCREEN TRANSFER METHOD

(71) Applicant: Sony Computer Entertainment Inc., Tokyo (JP)

(72) Inventor: Katsushi Otsuka, Saitama (JP)

(73) Assignees: Sony Coporation, Tokyo (JP); Sony Interactive Entertainment Inc., Tokyo (JP)

( * ) Notice: Subject to any disclaimer, the term of this patent is extended or adjusted under 35 U.S.C. 154(b) by 264 days.

(21) Appl. No.: 14/285,789

(22) Filed: May 23, 2014

(65) Prior Publication Data
US 2014/0362096 A1 Dec. 11, 2014

(30) Foreign Application Priority Data
Jun. 7, 2013 (JP) .................. 2013-121131

(51) Int. Cl.
*G09G 5/39* (2006.01)
*G06F 3/14* (2006.01)
(Continued)

(52) U.S. Cl.
CPC .......... *G06F 3/1423* (2013.01); *G06F 3/1454* (2013.01); *G06F 1/1683* (2013.01); *G06F 13/00* (2013.01); *G09G 5/391* (2013.01); *G09G 5/397* (2013.01); *G09G 2340/02* (2013.01); *G09G 2340/0407* (2013.01); *G09G 2340/10* (2013.01);
(Continued)

(58) Field of Classification Search
CPC ... H04L 1/00; H04L 2001/0094; H04L 5/003; H04L 5/0001; G06F 13/00; G06F 3/1423; G09G 5/391; G09G 5/397; G09G 2340/02; G09G 2340/0407; G09G 2340/10; G09G 3/00
See application file for complete search history.

(56) References Cited

U.S. PATENT DOCUMENTS 5,241,625 A * 8/1993 Epard ................... G06F 3/1454
345/502
5,826,035 A * 10/1998 Hamada .................... G06T 1/20
345/2.1

(Continued)

FOREIGN PATENT DOCUMENTS

JP 67182786 A 11/1982
JP 1994083294 A 3/1994

(Continued)

OTHER PUBLICATIONS

Office Action for corresponding JP application No. 2013-121131, dated Apr. 28, 2015.

(Continued)

*Primary Examiner* — Robert Craddock
(74) *Attorney, Agent, or Firm* — Matthew B. Dernier, Esq.

(57) ABSTRACT

There is provided a display controller for reading frame data from a frame buffer, and generating a screen output image to be displayed on a display, wherein the display controller is provided with a path for extracting the screen output image as a screen image for transfer to be transferred to another apparatus, and writing the screen image for transfer to a dedicated memory provided separately from the frame buffer.

9 Claims, 16 Drawing Sheets

(51) Int. Cl.
*G06F 1/16* (2006.01)
*H04L 1/00* (2006.01)
*H04L 5/00* (2006.01)
*G06F 13/00* (2006.01)
*G09G 5/391* (2006.01)
*G09G 5/397* (2006.01)

(52) U.S. Cl.
CPC ............ *G09G 2370/16* (2013.01); *H04L 1/00* (2013.01); *H04L 5/0001* (2013.01); *H04L 5/003* (2013.01); *H04L 2001/0094* (2013.01)

(56) References Cited

U.S. PATENT DOCUMENTS

| | | | | |
|---|---|---|---|---|
| 5,859,649 | A | 1/1999 | Yuu | |
| 6,940,516 | B1* | 9/2005 | Dotson | G09G 5/06 345/503 |
| 6,987,545 | B1* | 1/2006 | Klein | H04N 19/42 348/430.1 |
| 7,007,062 | B1* | 2/2006 | Serenyi | H04L 29/06 709/203 |
| 7,626,637 | B2* | 12/2009 | Chiu | G09G 5/399 345/539 |
| 8,094,160 | B2* | 1/2012 | Watanabe | G06F 12/0862 345/547 |
| 8,234,488 | B1 | 7/2012 | Riach | |
| 8,405,666 | B2* | 3/2013 | Masood | G06F 9/455 345/522 |
| 8,416,253 | B2* | 4/2013 | Minematsu | G06F 9/45533 345/545 |
| 8,427,491 | B2* | 4/2013 | Keslin | G06F 9/5044 345/506 |
| 2008/0291209 | A1* | 11/2008 | Sureka | G06F 3/14 345/531 |
| 2009/0125968 | A1* | 5/2009 | Perlman | A63F 13/12 725/133 |
| 2009/0141800 | A1* | 6/2009 | Larson | H04N 21/2365 375/240.12 |
| 2012/0120320 | A1* | 5/2012 | Chowdhry | H04N 9/75 348/586 |

FOREIGN PATENT DOCUMENTS

| | | |
|---|---|---|
| JP | 08314418 A | 11/1996 |
| JP | 1997319352 A | 12/1997 |
| JP | 2003259383 A | 9/2003 |

OTHER PUBLICATIONS

Office Action for corresponding JP application No. 2015209770, 7 pages, dated Oct. 4, 2016.

* cited by examiner

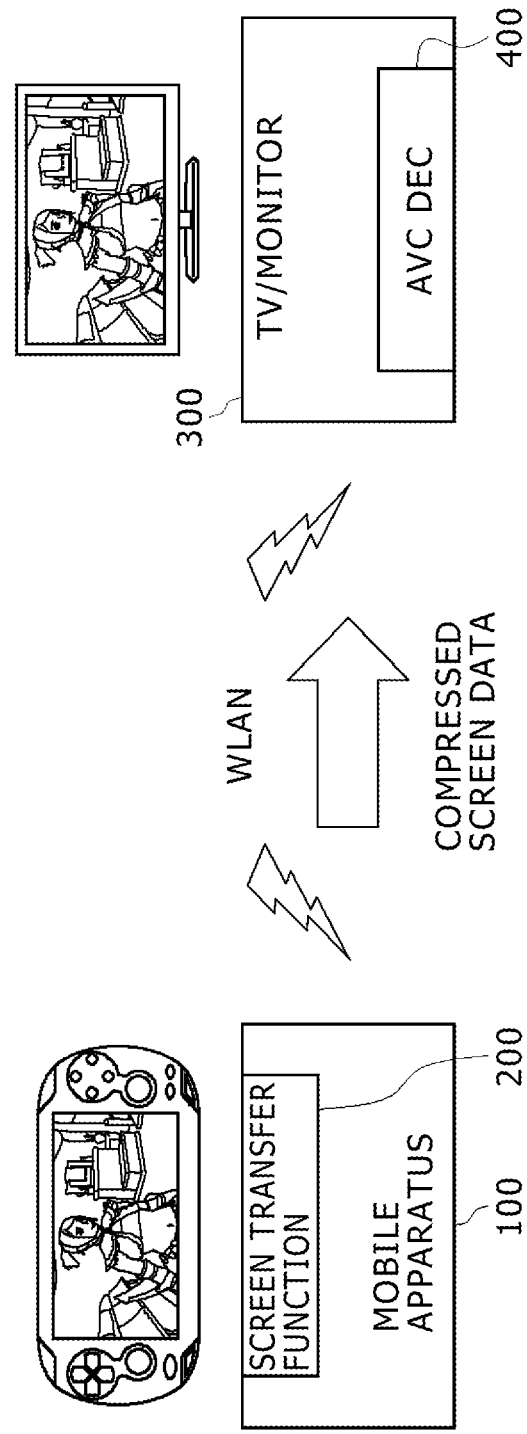

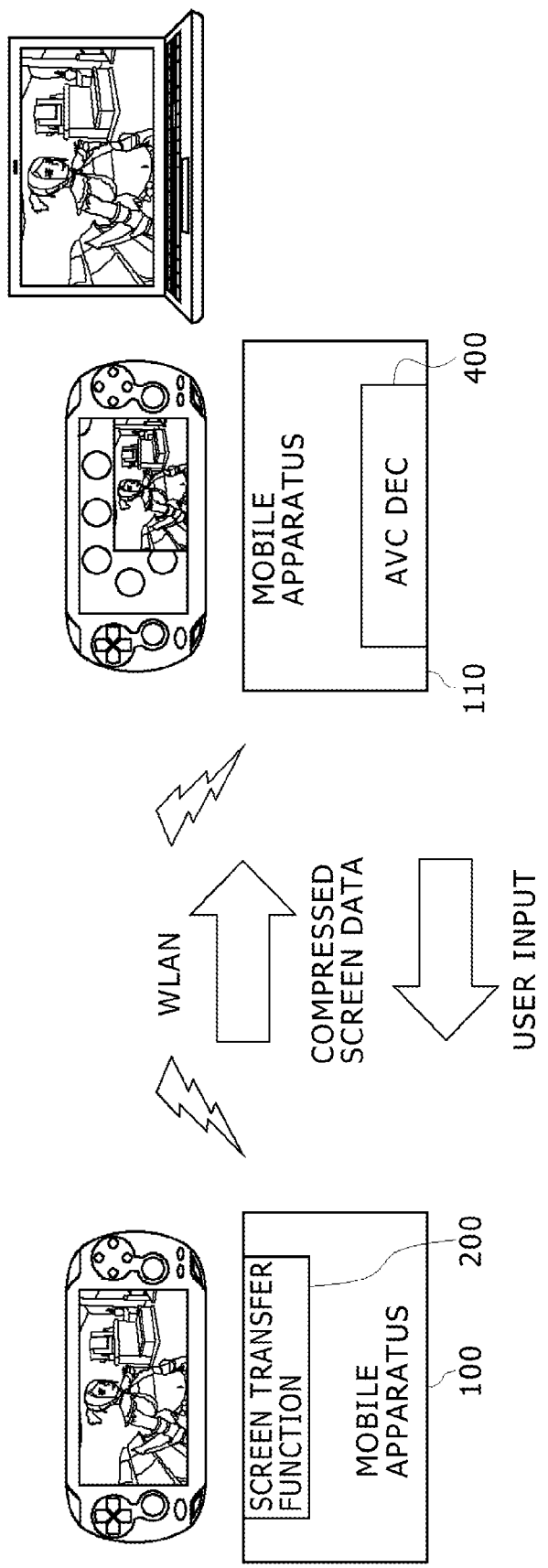

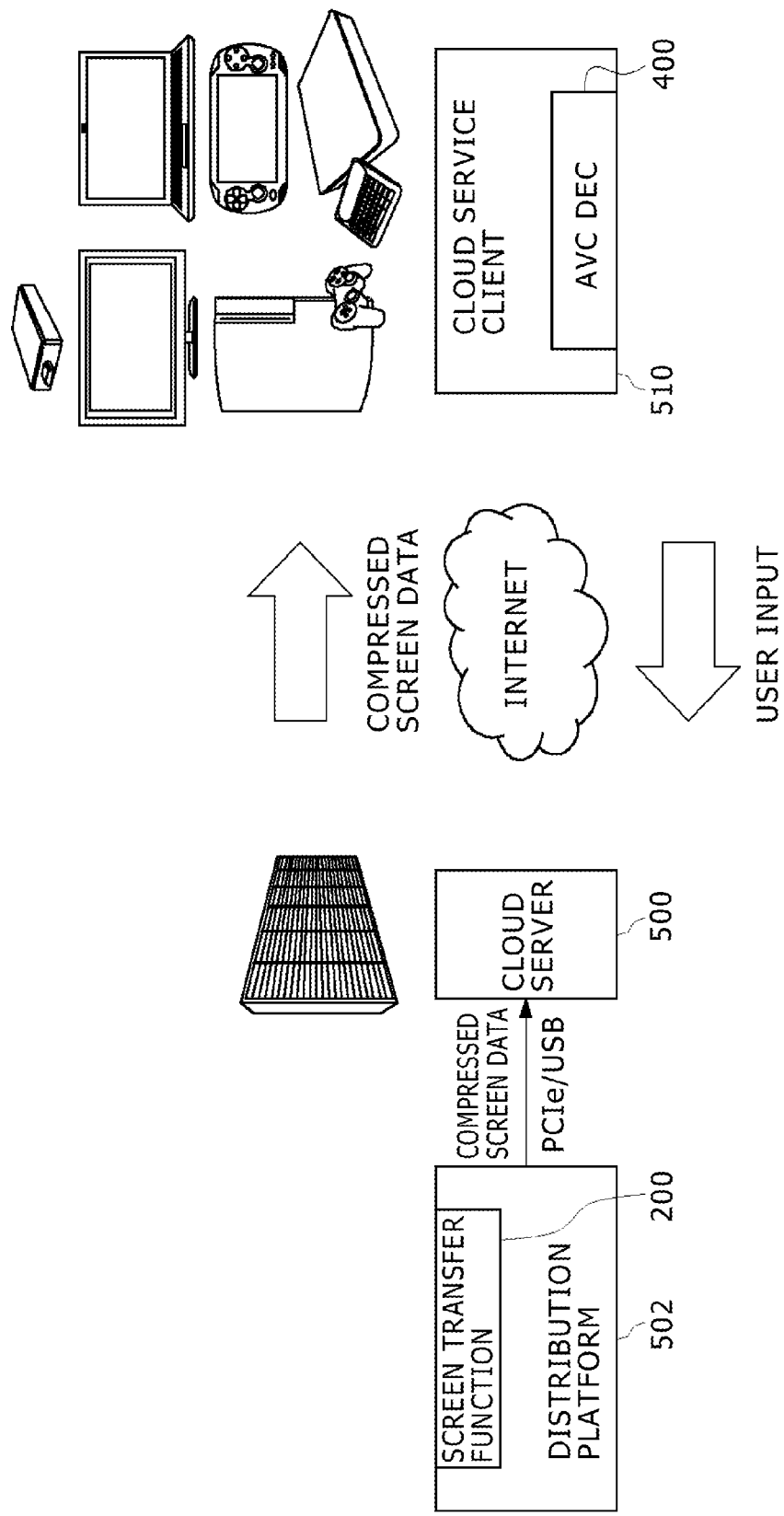

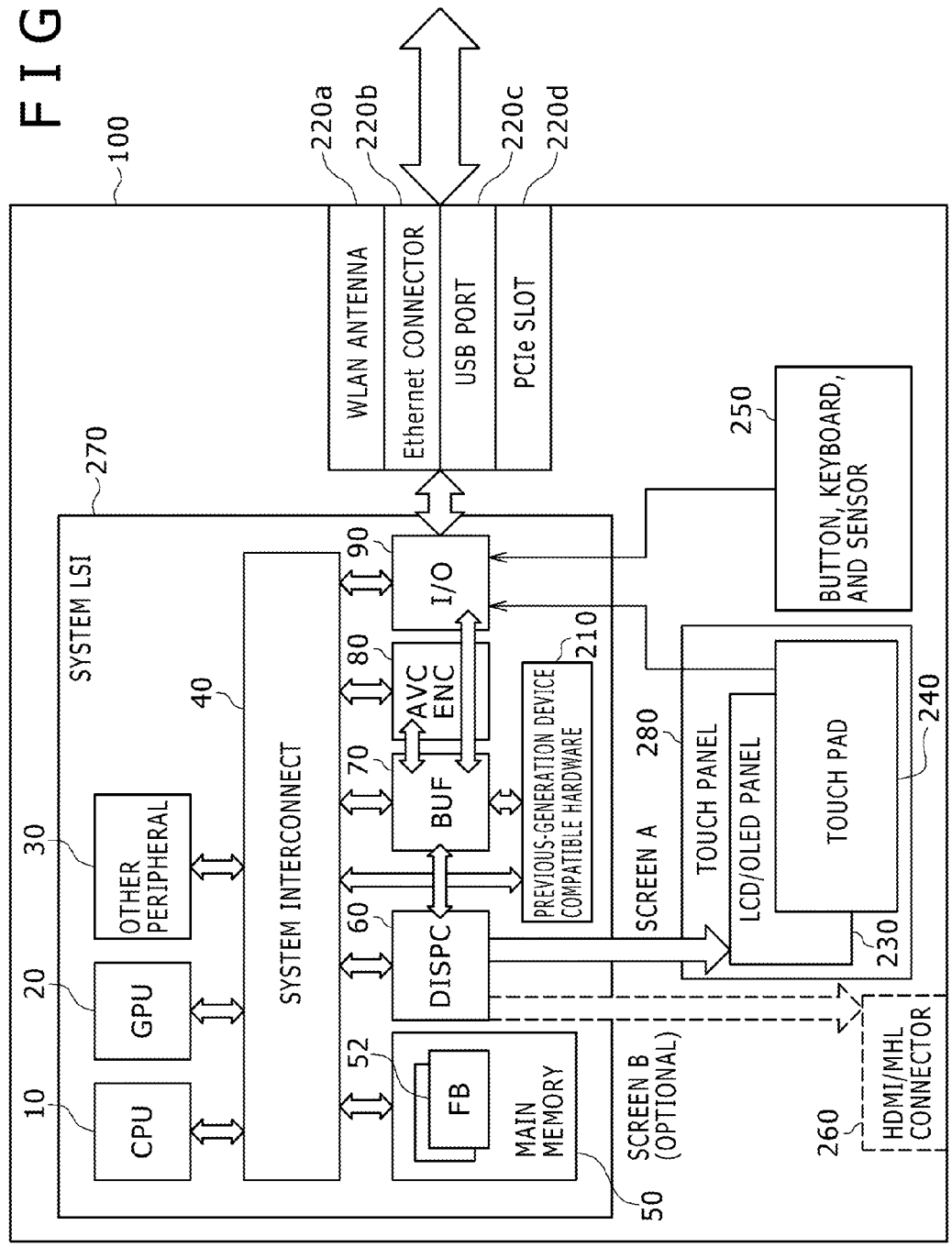

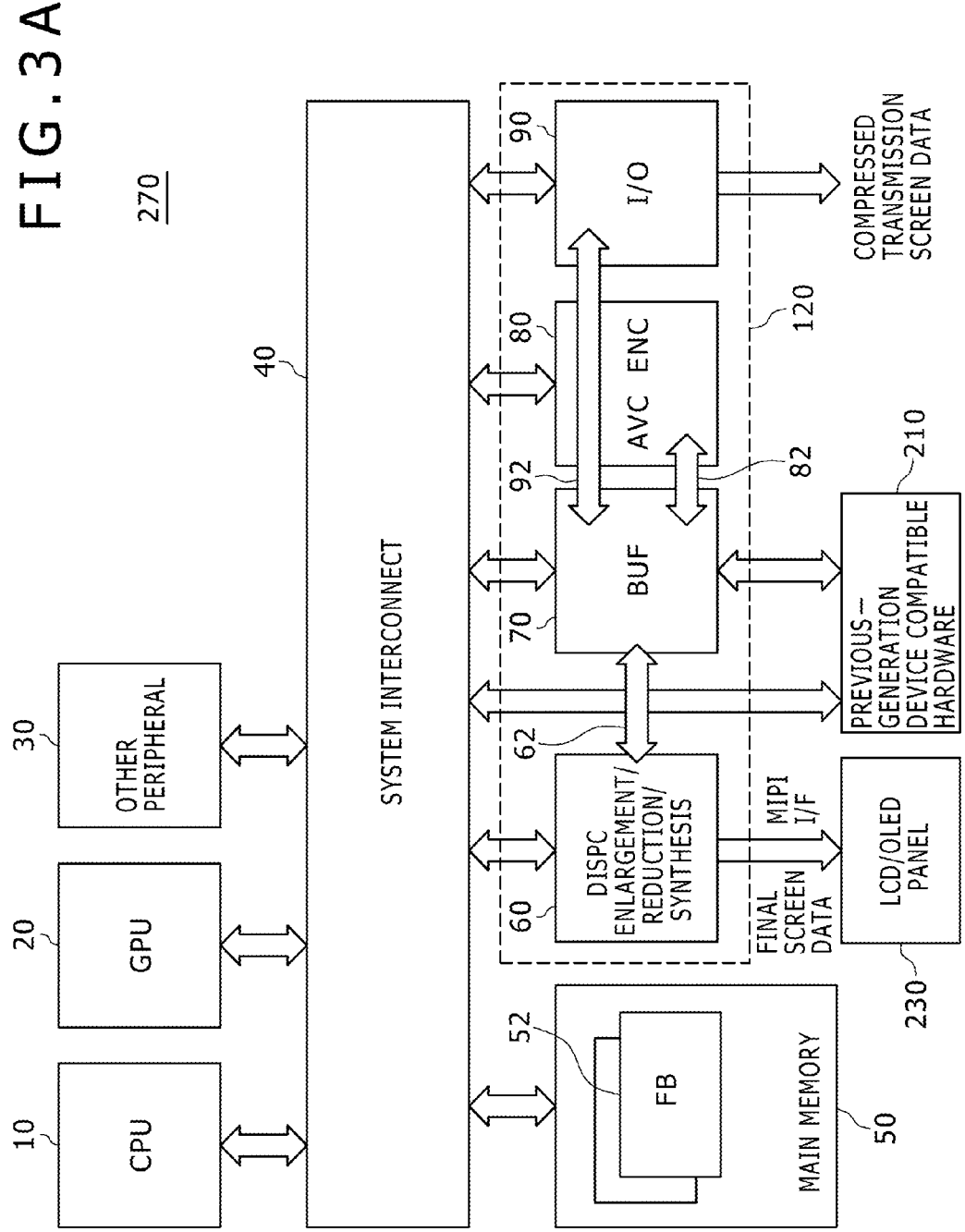

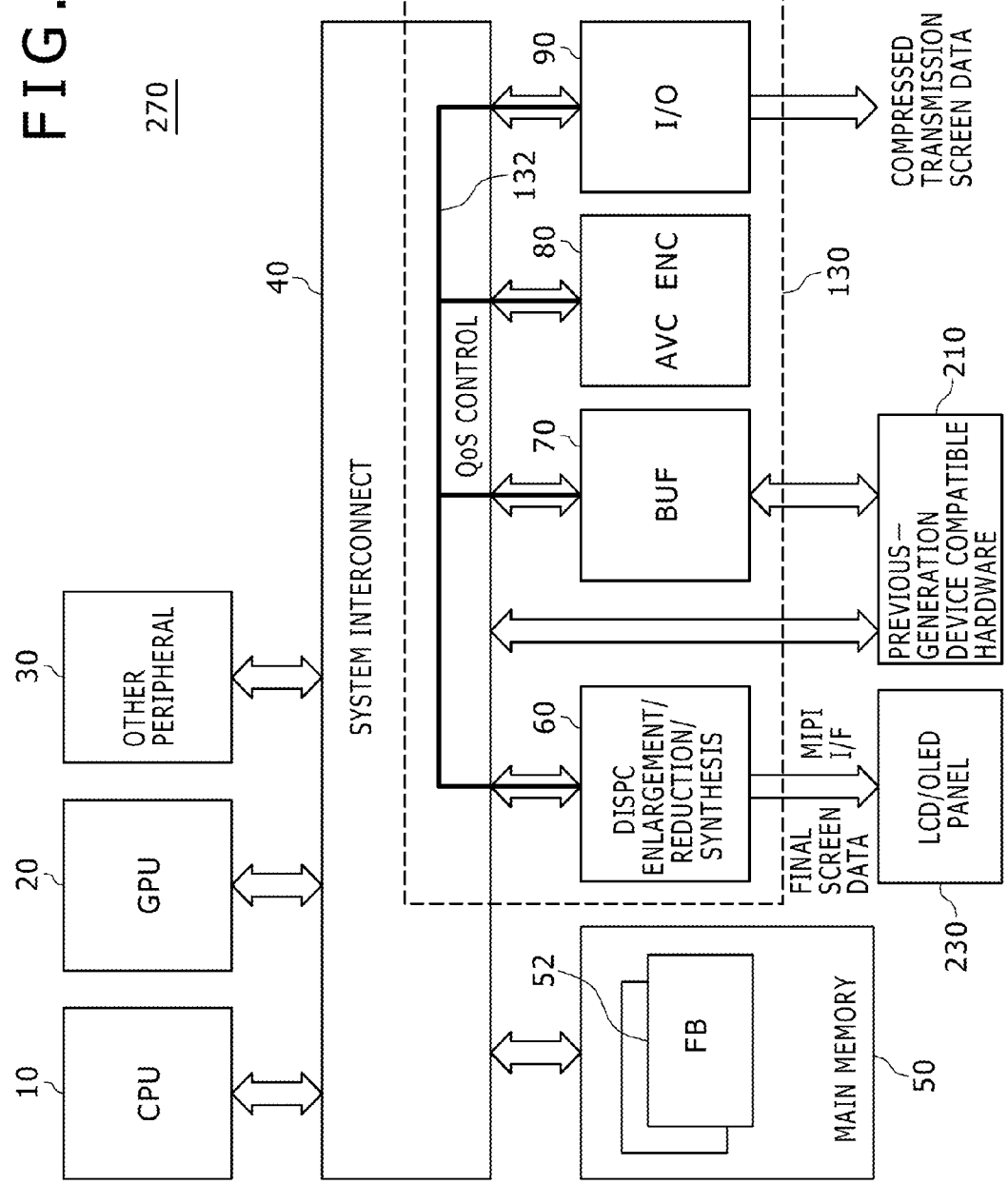

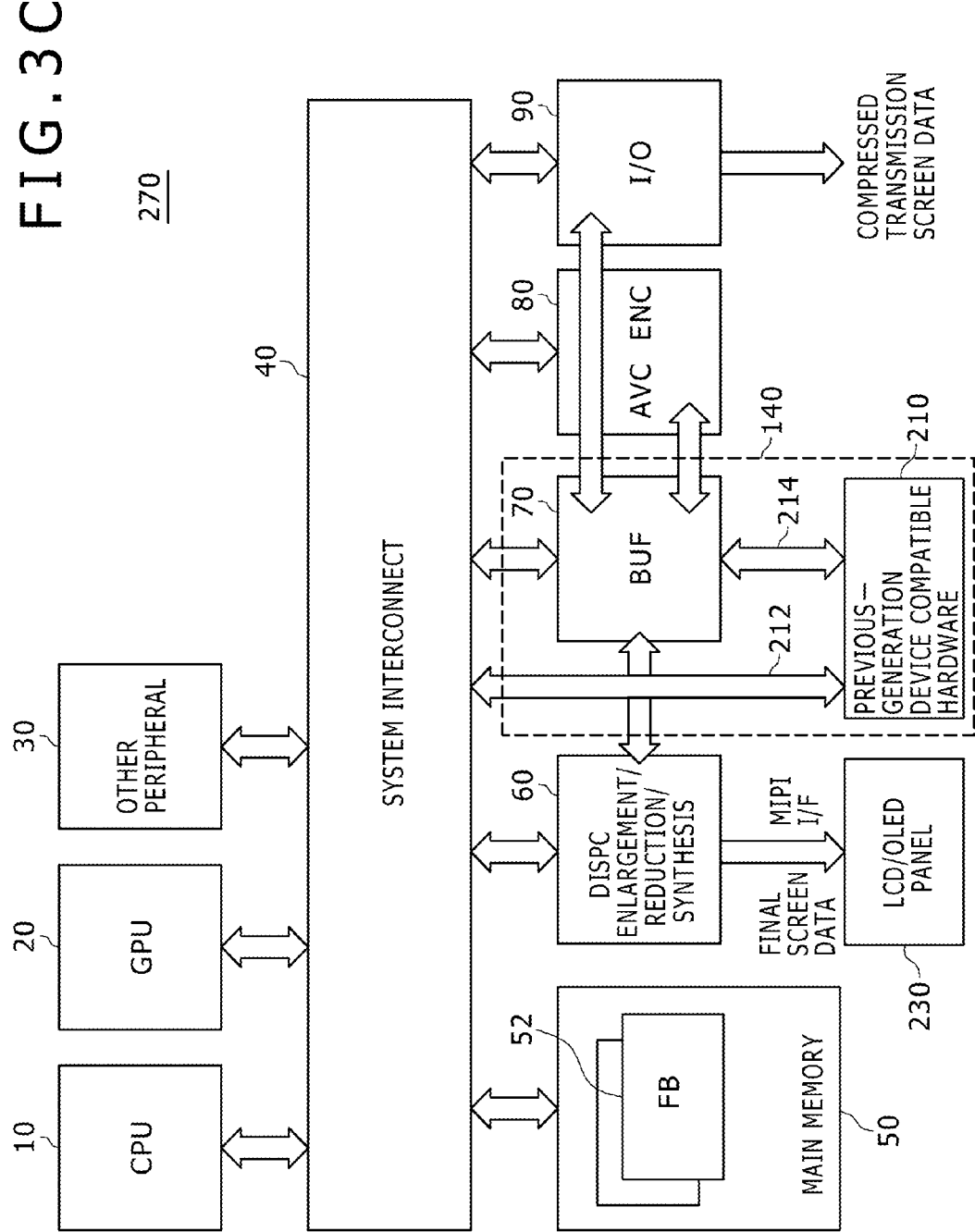

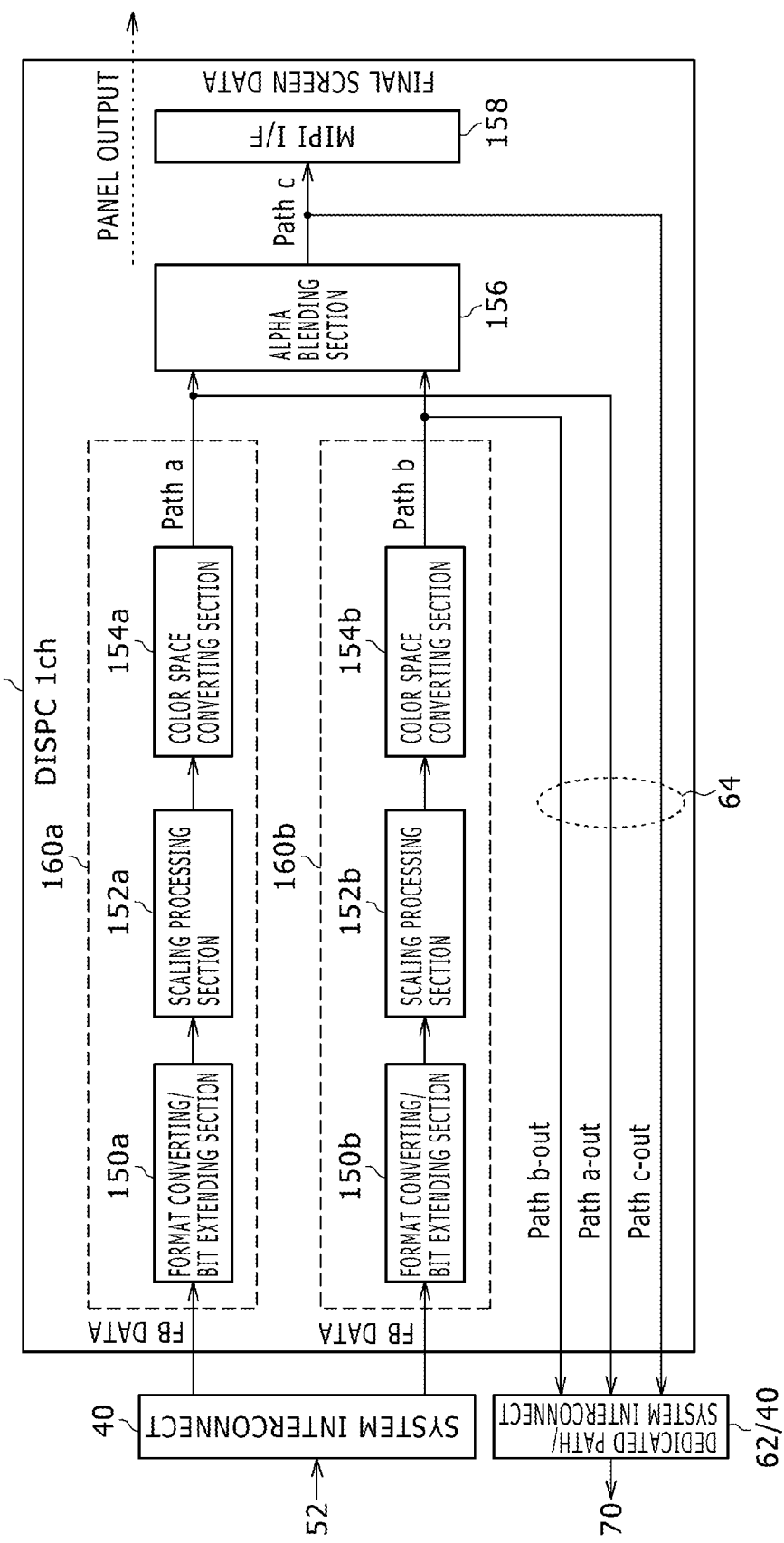

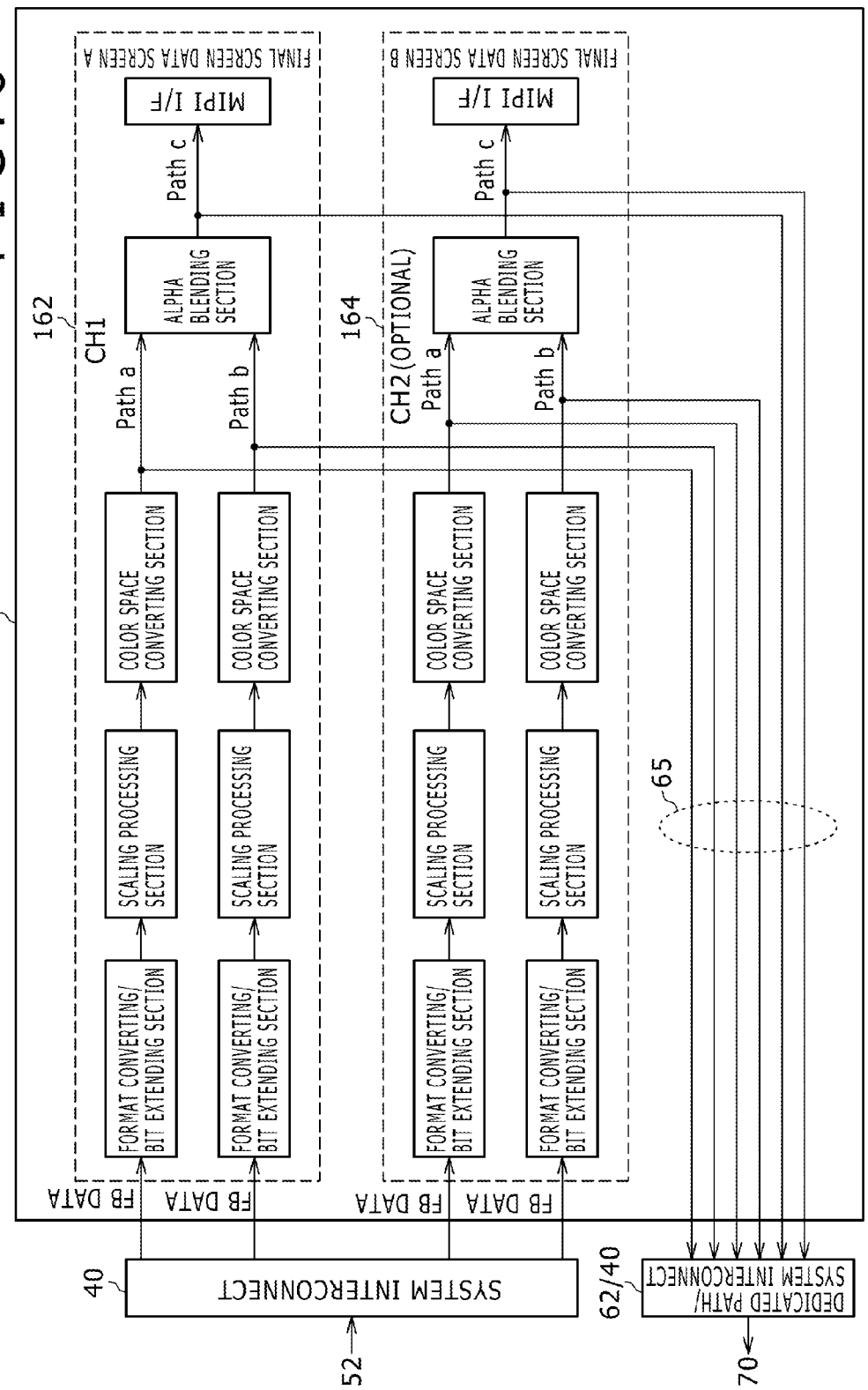

SCREEN A
1280 × 720 PIXELS

SCREEN B
1980 × 1080 PIXELS

SCREEN A
TOUCH OPERATION
MENU SCREEN

SCREEN B
GAME VIDEO

SCREEN A
1280 × 720 PIXELS

SCREEN B
1980 × 1080 PIXELS

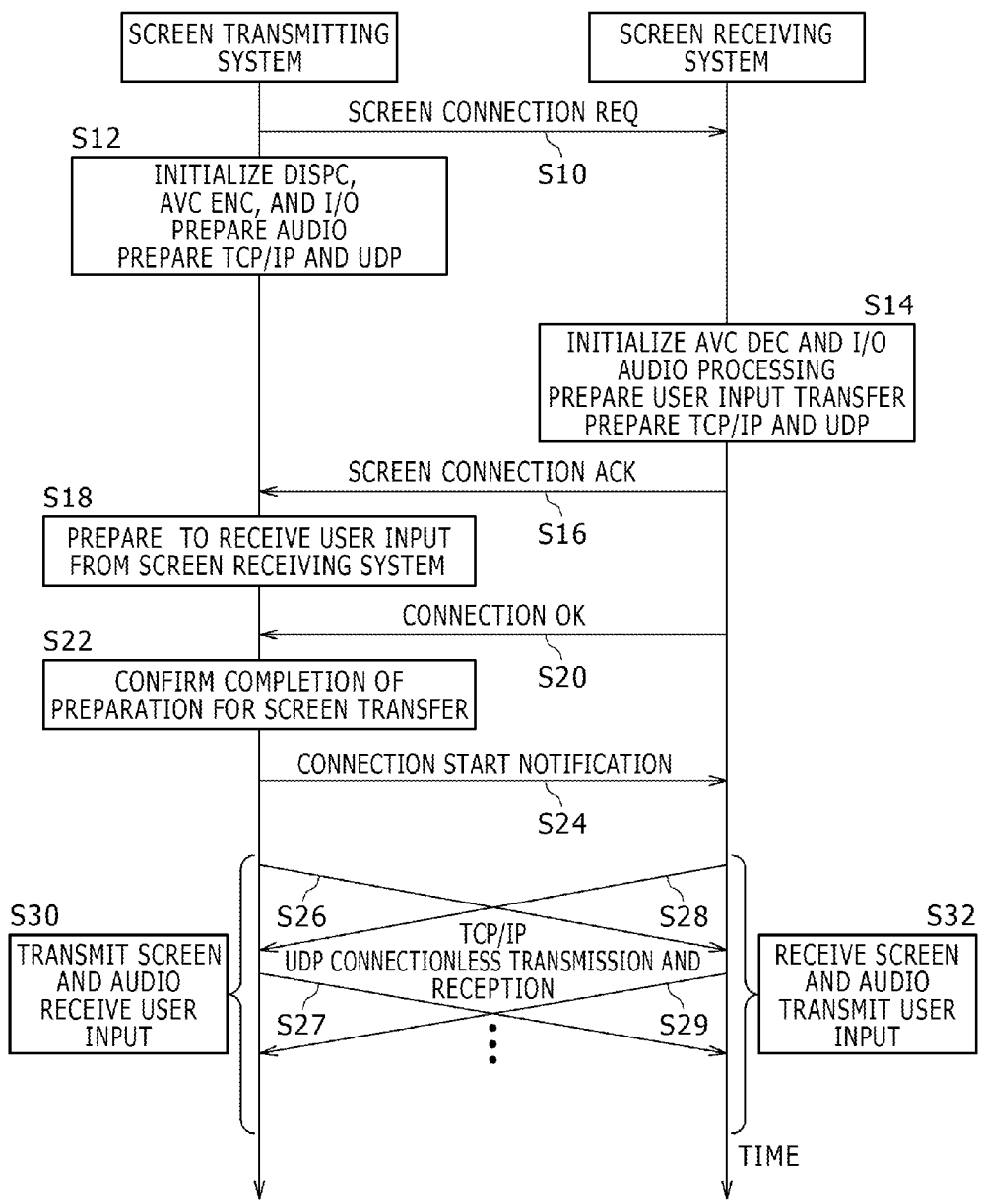

DISPLAY CONTROLLER, SCREEN TRANSFER DEVICE, AND SCREEN TRANSFER METHOD

BACKGROUND

The present technology relates to a technology for transferring a screen image.

The uses of graphics of high image quality have spread, such for example as uses in which a personal computer or a game dedicated machine executes an application such as a game, a simulation, or the like using high-quality three-dimensional computer graphics, or reproduces video contents obtained by combining actually photographed images with computer graphics.

On the other hand, display performance of display panels of mobile apparatuses such as smart phones, tablet terminals, and the like has been enhanced, and computer graphics and video of high image quality are also used in the mobile apparatuses.

SUMMARY

The mobile apparatuses generally have a small screen. There is thus a need to display and view the screen of a mobile apparatus on a large screen of a television set, a monitor of a stationary game machine, or the like. There is also a need to connect a mobile apparatus to another apparatus to enable a family or friends to view a same screen, or to share a screen between a plurality of users to enjoy an application such as a game or the like.

The present technology has been made in view of such problems. It is desirable to provide a technology for transferring a screen image generated by a certain apparatus to another apparatus and displaying the screen image on the other apparatus.

A display controller according to a mode of the present technology is a display controller for reading frame data from a frame buffer, and generating a screen output image to be displayed on a display, wherein the display controller is provided with a path for extracting the screen output image as a screen image for transfer to be transferred to another apparatus, and writing the screen image for transfer to a dedicated memory provided separately from the frame buffer.

Another mode of the present technology is a screen transfer device. The device includes: a main memory including a frame buffer; a display controller configured to read frame data from the frame buffer, and generate a screen output image to be displayed on a display; a dedicated memory disposed separately from the main memory; and a system interconnect configured to interconnect the main memory, the display controller, and the dedicated memory with each other. A path is provided for extracting the screen output image as a screen image for transfer to be transferred to another apparatus from the display controller, and writing back the screen image for transfer to the dedicated memory without the screen image for transfer passing through the system interconnect.

Yet another mode of the present technology is also a screen transfer device. The device includes: a main memory including a frame buffer; a display controller configured to read frame data from the frame buffer, and generate a screen output image to be displayed on a display; a dedicated memory configured to store the screen output image generated by the display controller as a screen image for transfer to be transferred to another apparatus; and an encoder configured to compression-code the screen image for transfer. The encoder compression-codes the screen image for transfer without performing inter-frame prediction.

Yet another mode of the present technology is a screen transfer method. The method is a method for transferring a screen image in a device, the device including a main memory, a display controller, and a dedicated memory interconnected with each other by a system interconnect, the method including: reading frame data from a frame buffer included in the main memory, and generating a screen output image to be displayed on a display by the display controller; extracting the screen output image as a screen image for transfer to be transferred to another apparatus from the display controller, and writing back the screen image for transfer to the dedicated memory without the screen image for transfer passing through the system interconnect; and compression-coding the screen image for transfer, the screen image for transfer being written back to the dedicated memory, and transferring the screen image for transfer to the other apparatus.

It is to be noted that arbitrary combinations of the above constituent elements as well as modes obtained by converting expressions of the present technology between a method, a device, a system, a computer program, a data structure, a recording medium, and the like are also effective as modes of the present technology.

According to the present technology, a screen image generated by a certain apparatus can be efficiently transferred to another apparatus and displayed on the other apparatus.

BRIEF DESCRIPTION OF THE DRAWINGS

FIG. 1A is a block diagram of a system that transfers a screen from a mobile apparatus to a TV (television)/monitor;

FIG. 1C is a block diagram of a system that transmits a screen from a mobile apparatus to another mobile apparatus;

FIG. 1D is a block diagram of a system in which a distribution platform transfers a screen to a cloud service client via a cloud server;

FIG. 2 is a block diagram of a mobile apparatus;

FIG. 3A is a diagram of assistance in explaining an example of implementation of a screen transfer function in a system LSI in FIG. 2;

FIG. 3B is a diagram of assistance in explaining another example of implementation of the screen transfer function in the system LSI in FIG. 2;

FIG. 3C is a diagram of assistance in explaining a configuration in which a dedicated memory in FIG. 2 is shared between screen transfer processing and downward compatible processing;

FIG. 4 is a block diagram of a display controller in FIG. 2;

FIG. 6 is a diagram of assistance in explaining a configuration of a display controller provided with two channels of image output;

FIG. 10 is a flowchart of assistance in explaining a procedure for software handshaking between a screen transmitting system and a screen receiving system.

DETAILED DESCRIPTION OF THE PREFERRED EMBODIMENTS

Figure 1B:
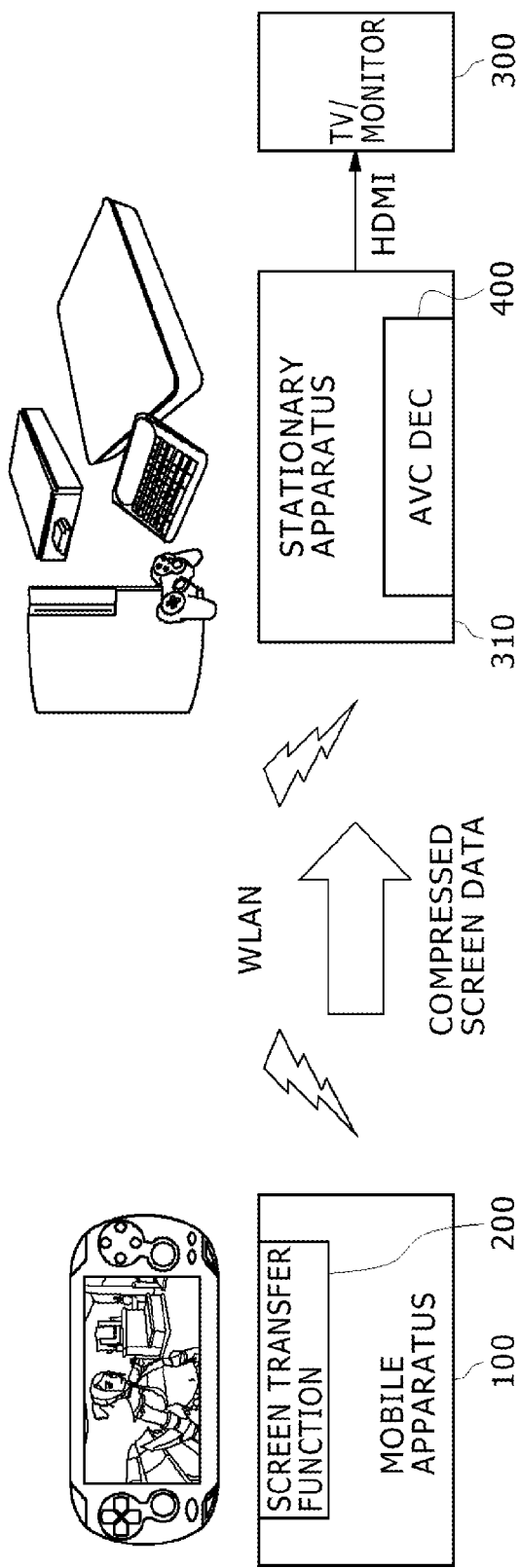
FIG. 1B is a block diagram of a system that transmits a screen from a mobile apparatus to a stationary apparatus.

A screen transfer system according to an embodiment transfers a screen from a certain apparatus to another apparatus in real time. Further, when a user provides some operating input on the apparatus as the transfer destination, the operation contents are transferred to the apparatus as the transfer source, and an updated screen reflecting the operation contents is transferred to the apparatus as the transfer destination. A few examples of configuration of the screen transfer system according to the embodiment will be described with reference to FIGS. 1A to 1E.

FIG. 1A is a block diagram of a system that transfers a screen from a mobile apparatus 100 to a TV/monitor 300.

The mobile apparatus 100 and the TV/monitor 300 are connected to each other by a network such as a wireless LAN (Local Area Network) or the like. The mobile apparatus 100 is for example a portable apparatus such as a portable game machine, a smart phone, a tablet, or the like. The mobile apparatus 100 has a screen transfer function 200 to be described in the following.

The screen transfer function 200 compression-codes a screen generated by a display controller of the mobile apparatus 100 (which screen is not necessarily a screen displayed on a display of the mobile apparatus 100) by a moving image compression-coding system such as MPEG-4 AVC (Moving Picture Experts Group-4 Advanced Video Coding) or the like, and transfers the compression-coded screen to the TV/monitor 300 via the network such as the wireless LAN or the like.

The TV/monitor 300 has an AVC (Advanced Video Coding) decoder 400. The TV/monitor 300 decodes the compressed screen data received from the mobile apparatus 100, and displays the decoded screen data on a large screen display. The image viewed on the small screen of the mobile apparatus 100 can thereby be displayed on the large screen of the TV/monitor 300.

FIG. 1B is a block diagram of a system that transmits a screen from a mobile apparatus 100 to a stationary apparatus 310.

The mobile apparatus 100 and the stationary apparatus 310 are connected to each other by a network such as a wireless LAN or the like. A screen transfer function 200 of the mobile apparatus 100 compression-codes the screen generated by a display controller, and transfers the compression-coded screen to the stationary apparatus 310 via the network such as the wireless LAN or the like. The stationary apparatus 310 is for example a stationary game machine, a television receiver, a recorder, a set-top box for CATV (Cable Television), or the like.

The stationary apparatus 310 has an AVC decoder 400. The stationary apparatus 310 decodes the compressed screen data received from the mobile apparatus 100, and displays the decoded screen data on a TV/monitor 300 connected to the stationary apparatus 310 by HDMI (High Definition Multimedia Interface) (registered trademark), MHL (Mobile High-definition Link), or the like. The image viewed on a small screen of the mobile apparatus 100 can thereby be displayed on a large screen of the TV/monitor 300. In addition, when the stationary apparatus 310 has a recording function, video transferred from the mobile apparatus 100 can be recorded.

FIG. 1C is a block diagram of a system that transmits a screen from a mobile apparatus 100 to another mobile apparatus 110.

The first mobile apparatus 100 and the second mobile apparatus 110 are connected to each other by a network such as a wireless LAN or the like. The first mobile apparatus 100 has a screen transfer function 200. The second mobile apparatus 110 has an AVC decoder 400. The screen transfer function 200 compression-codes the screen displayed on a display of the first mobile apparatus 100, and transfers the compression-coded screen to the second mobile apparatus 110 via the network such as the wireless LAN or the like. The second mobile apparatus 110 decodes the compressed screen data received from the first mobile apparatus 100, and displays the decoded screen data on a display panel.

Further, the second mobile apparatus 110 receives an input from a user, and transmits the contents of the input to the first mobile apparatus 100. The first mobile apparatus 100 generates a screen reflecting the contents of the input from the user which contents are received from the second mobile apparatus 110, and transfers the screen to the second mobile apparatus 110. Thereby, in a case of a battle game, a game screen is shared between the first mobile apparatus 100 and the second mobile apparatus 110, so that a plurality of users can join the game. In addition, sharing the screen between the first mobile apparatus 100 and the second mobile apparatus 110 enables a plurality of users to have a net meeting.

FIG. 1D is a block diagram of a system in which a distribution platform 502 transfers a screen to a cloud service client 510 via a cloud server 500.

The distribution platform 502 has a screen transfer function 200. The distribution platform 502 is connected to the cloud server 500 via an interface such as PCI (Peripheral Component Interconnect) Express (PCIe), USB (Universal Serial Bus), or the like. The screen transfer function 200 compression-codes the screen desired to be transferred to the cloud service client 510, and supplies the compression-coded screen to the cloud server 500. The cloud server 500 transmits the compressed screen data to the cloud service client 510 via the Internet.

The cloud service client 510 has an AVC decoder 400. The cloud service client 510 decodes the compressed screen data, and displays the decoded screen data on a display. Further, the cloud service client 510 receives an input from a user, and transmits the contents of the input to the cloud server 500. The distribution platform 502 generates a screen reflecting the contents of the input from the user which contents are received from the cloud server 500, compression-codes the screen, and supplies the compression-coded screen to the cloud server 500. The cloud service client 510 receives the screen reflecting the contents of the input from the user from the cloud server 500.

Figure 1E:
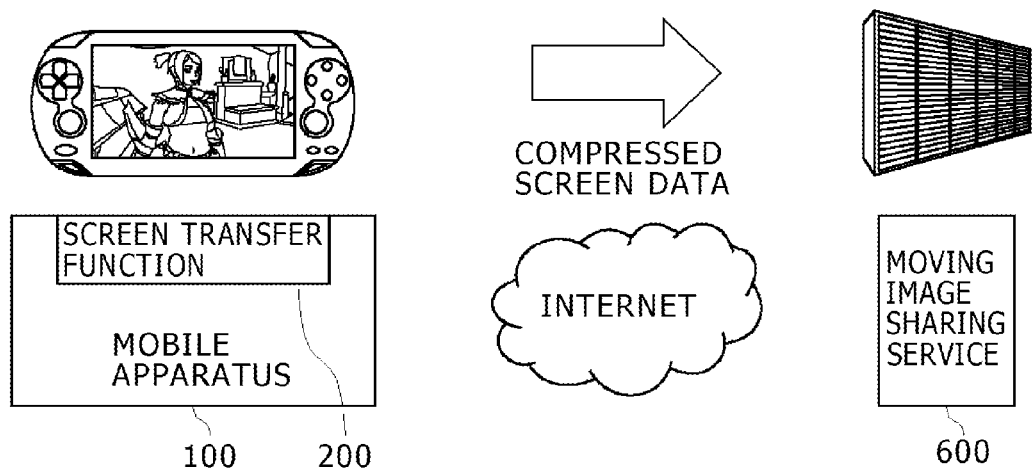
FIG. 1E is a block diagram of a system that uploads screen data from a mobile apparatus to a moving image sharing service.

FIG. 1E is a block diagram of a system that uploads screen data from a mobile apparatus 100 to a moving image sharing service 600.

The mobile apparatus 100 has a screen transfer function 200. The mobile apparatus 100 compression-codes a screen displayed on a display, and transmits the compression-coded screen to the moving image sharing service 600 via the Internet. The screen displayed on the display of the mobile apparatus 100 is thereby uploaded as a moving image to the moving image sharing service 600.

The mobile apparatus 100, the distribution platform 502, and the like on the transmitting side having the screen transfer function 200, which have been described in the configuration examples of FIGS. 1A to 1E, will be referred to collectively as a "screen transmitting system." In addition, the TV/monitor 300, the stationary apparatus 310, the mobile apparatus 110, the cloud service client 510, and the like on the receiving side having the AVC decoder 400 will be referred to collectively as a "screen receiving system." In the following, configurations and processing procedures will be described by taking the mobile apparatus 100 as an example of the "screen transmitting system" and taking the TV/monitor 300 as an example of the "screen receiving system." However, examples of the "screen transmitting system" and the "screen receiving system" are not limited to the mobile apparatus 100 and the TV/monitor 300.

FIG. 2 is a block diagram of the mobile apparatus 100. The mobile apparatus 100 includes a system LSI (Large-Scale Integration) 270. The system LSI 270 includes a CPU (Central Processing Unit) 10, a graphics processing unit (GPU) 20, a peripheral 30, a main memory 50, a display controller (DISPC) 60, a dedicated memory 70, an AVC encoder 80, and an I/O (Input/Output) 90. These constituent elements are connected to each other by a system interconnect 40.

The CPU 10 executes an application, and controls each constituent element of the system LSI 270. The GPU 20 performs graphics processing, thereby generates a moving image, and stores the moving image in a frame buffer 52 of the main memory 50. The peripheral 30 controls various kinds of peripheral devices.

The system interconnect 40 is a connection that connects the system components to each other. The system interconnect 40 has an arbitrary physical form such as a shared bus, a crossbar switch, a ring bus, a tree-shaped network, or the like. The system interconnect 40 can adopt an arbitrary data transmission system such as a handshaking system, a packet based network, or the like. These physical forms and data transfer systems are illustrative, and the physical form and the data transfer system of the system interconnect 40 are not limited to the examples cited above.

The mobile apparatus 100 has a touch panel 280 including an LCD (Liquid Crystal Display)/OLED (Organic Light Emitting Diode) panel 230 and a touch pad 240.

The main memory 50 includes a plurality of frame buffers 52 storing the frames of moving images. The DISPC 60 reads the images stored in the plurality of frame buffers 52 in line units, subjects the images to conversion processing, generates a final screen image at a certain refresh rate, and outputs the final screen image to the LCD/OLED panel 230. In addition, as an option, the DISPC 60 can output the final screen image to an HDMI/MHL (High-Definition Multimedia Interface/Mobile High-definition Link) connector 260 to display the screen on an external display or the like connected to the HDMI/MHL connector 260 by HDMI/MHL.

The DISPC 60 according to the present embodiment is provided with a dedicated path for extracting the generated screen image as a screen image for transfer (which path will be referred to as a "writing-back path for transfer"). The DISPC 60 as an initiator (bus master) can output the screen image for transfer to the dedicated path or the system interconnect 40 via the writing-back path for transfer, and write back the screen image for transfer to the dedicated memory 70 provided separately from the main memory 50.

The AVC encoder 80 reads the screen image for transfer which screen image is stored in the dedicated memory 70, compression-codes the screen image for transfer by a moving image compression-coding system such as MPEG-4 AVC or the like, and writes the compression-coded screen data to the dedicated memory 70.

In MPEG-4 AVC, inter-frame prediction using I-frames (Intra-coded Frames), P-frames (Predicted Frames), and B-frames (Bi-directional Predicted Frames) is usually performed. However, the AVC encoder 80 according to the present embodiment may compression-code images using only I-frames without performing inter-frame prediction in order to ensure a real-time characteristic of screen transfer.

When inter-frame prediction is performed, an amount of data after compression is reduced, so that a transfer band can be reduced. However, the prediction takes a processing time, and increases a latency of screen transfer. Accordingly, in view of a fact that connections between apparatuses by WLAN (Wireless Local Area Network), Bluetooth (trademark), and the like have been increased in speed, the AVC encoder 80 according to the present embodiment adopts a system that compression-codes images using only I-frames without performing inter-frame prediction, with compression efficiency sacrificed and priority given to decreasing the latency. When the band of a connection between apparatuses is limited, a necessary band can be reduced by increasing a compression ratio so as to provide an amount of data that is equal to that of inter-frame prediction, though image quality is degraded.

Incidentally, in a use in which latency is not a problem, as in a case of uploading a moving image to the moving image sharing service 600 shown in FIG. 1E, compression coding may be performed by ordinary inter-frame prediction, with priority given to the compression ratio.

The MPEG-4 AVC standard permits the compression-coding of moving images using only I-frames without performing inter-frame prediction. Thus, a decoder compliant with the standard can decode a moving image compression-coded using only I-frames. Hence, the screen receiving system does not need dedicated hardware or software, and can decode the screen image for transfer by merely incorporating the general-purpose AVC decoder 400. It is therefore possible to deal with a wide variety of apparatuses.

The I/O 90 reads the compressed screen data from the dedicated memory 70, and outputs the compressed screen data to an external connection interface such as a WLAN antenna 220a, an Ethernet (registered trademark) connector 220b, a USB port 220c, a PCIe slot 220d, or the like to transmit the compressed screen data to the outside. These external connection interfaces are used also to transmit audio data and general-purpose processing results to the outside.

In addition, the I/O 90 receives a user input from a button, keyboard, and sensor 250 and the touch pad 240, and supplies the user input to the CPU 10. As required, the CPU 10 outputs the data input from the user to the external connection interface such as the WLAN antenna 220a, the Ethernet connector 220b, the USB port 220c, the PCIe slot 220d, or the like via the I/O 90 to transmit the data to the outside.

A previous-generation device compatible hardware 210 is a previous-generation device hardware configuration for maintaining compatibility with a previous-generation device such as a previous-generation game machine or the like. The previous-generation device compatible hardware 210 for example includes the circuitry of a CPU, a VFPU (Vector Floating-Point Unit) as an FPU (Floating-Point Unit) performing vector operation, a GPU, a DMA (Direct Memory Access) controller, and the like. The previous-generation device compatible hardware 210 is connected to the system interconnect 40, and uses the dedicated memory 70 as a buffer for reading and writing data.

A configuration of the screen transfer function 200 implemented within the system LSI 270 will be described with reference to FIGS. 3A to 3C.

FIG. 3A is a diagram of assistance in explaining an example of implementation of the screen transfer function 200 in the system LSI 270. In the present implementation example, the DISPC 60, the dedicated memory 70, the AVC encoder 80, and the I/O 90 enclosed by a dotted line 120 within the system LSI 270 function as a main block of the screen transfer function 200 of the screen transmitting system described with reference to FIGS. 1A to 1E.

The DISPC 60 reads frame data from the plurality of frame buffers 52 of the main memory 50 in line units, subjects the frame data to conversion processing such as enlargement, reduction, synthesis, and the like according to the size of the LCD/OLED panel 230, generates final screen data at the refresh rate of the LCD/OLED panel 230, and displays the final screen data on the LCD/OLED panel 230.

On the other hand, the DISPC 60 is provided with a dedicated path 62 for extracting the screen image that has been subjected to conversion processing such as enlargement, reduction, synthesis, and the like and writing back the screen image to the dedicated memory 70. The screen image after the conversion processing is written back to the dedicated memory 70. The AVC encoder 80 reads the screen image after the conversion processing which screen image is stored in the dedicated memory 70 from the dedicated memory 70 via a dedicated path 82, compression-codes the screen image, and writes the compression-coded screen image to the dedicated memory 70 via the dedicated path 82. The I/O 90 reads the compression-coded screen image from the dedicated memory 70 via a dedicated path 92, and transfers the screen image as a screen image for transfer to an apparatus as a transfer destination.

In the implementation example of FIG. 3A, the dedicated paths 62, 82, and 92 are used, and the system interconnect 40 does not intervene, in reading and writing the data from and to the dedicated memory 70 when the screen image generated by the DISPC 60 is extracted, compression-coded, and output to the outside as a transfer screen image. That is, the dedicated memory 70 and the dedicated paths 62, 82, and 92 are used for a data flow of the compressed transfer screen image, and the data paths are separated from ordinary data processing using the system interconnect 40. This enables screen transfer processing to be performed without narrowing the data transfer band of the system interconnect 40. In addition, screen transfer processing can be performed with low latency because the dedicated memory 70 is accessed directly through the dedicated paths 62, 82, and 92 and it is not necessary to access the main memory 50 via the system interconnect 40.

FIG. 3B is a diagram of assistance in explaining another example of implementation of the screen transfer function 200 in the system LSI 270. In the present implementation example, the DISPC 60, the dedicated memory 70, the AVC encoder 80, the I/O 90, and the system interconnect 40 enclosed by a dotted line 130 within the system LSI 270 function as a main block of the screen transfer function 200 of the screen transmitting system described with reference to FIGS. 1A to 1E.

The implementation example of FIG. 3B is different from the implementation example of FIG. 3A in that the system interconnect 40 is used in reading and writing the data from and to the dedicated memory 70 when the screen image generated by the DISPC 60 is extracted, compression-coded, and output to the outside as a transfer screen image.

The system interconnect 40 reserves a band for a data flow of the transfer screen image by a QoS (Quality of Service) function, and separates a data path from ordinary processing. Even when the system interconnect 40 is shared between the screen transfer processing and the ordinary processing, this QoS control can prevent a situation in which the real-time characteristic is lost due to a delay caused in the transfer of the screen image as a result of the screen transfer processing being affected by the ordinary processing, and conversely prevent a situation in which response deteriorates due to a delay caused in the data processing of the ordinary processing as a result of the data transmission band of the system interconnect 40 being narrowed by the screen transfer processing.

FIG. 3C is a diagram of assistance in explaining a configuration in which the dedicated memory 70 is shared between screen transfer processing and downward compatible processing.

The previous-generation device compatible hardware 210 is a hardware block of a previous-generation device such as a previous-generation game machine or the like. The previous-generation device compatible hardware 210 reads and writes data using the dedicated memory 70 rather than the main memory 50. In order to maintain compatibility with the previous-generation device, the dedicated memory 70 is designed so as to have a latency and a band that are equal to those of a video memory included in the previous-generation device. The main memory 50 accessed via the system interconnect 40 has a higher latency than the video memory included in the previous-generation device, and is thus not suitable for maintaining the compatibility.

When the previous-generation device compatible hardware 210 operates, the dedicated memory 70 is used as the video memory, and the GPU of the previous-generation device compatible hardware 210 writes rendering data to the dedicated memory 70. On the other hand, as described with reference to FIG. 3A and FIG. 3B, the screen transfer processing needs to be operated in real time without being affected by the ordinary processing. For this purpose, the dedicated memory 70 is included separately from the main memory 50, and the screen image for transfer is written to the dedicated memory 70. One dedicated memory 70 is shared between the previous-generation device compatible processing and the screen transfer processing. Both of an objective of maintaining compatibility with the previous-generation device and an objective of ensuring the real-time characteristic of the screen transfer processing are achieved at the same time. It is thereby possible to reduce a circuit scale and perform the previous-generation device compatible processing and the screen transfer processing efficiently.

FIG. 4 is a block diagram of the DISPC 60. The DISPC 60 reads frame data in line units from the plurality of frame buffers 52 of the main memory 50 via the system interconnect 40, performs format conversion, bit extension processing, scaling processing, and color space conversion, generates final screen data by synthesizing images by alpha blending, and outputs the final screen data to the panel. The pipeline of the DISPC 60 performs a screen update at the refresh rate of the display screen. For example, when the refresh rate is 60 Hz, the final screen is generated 60 times per second.

A path a (reference numeral 160a) includes a format converting/bit extending section 150a, a scaling processing section 152a, and a color space converting section 154a, and subjects frame data read from a first frame buffer 52 to format conversion, bit extension processing, scaling processing, and color space conversion.

A path b (reference 160b) includes a format converting/bit extending section 150b, a scaling processing section 152b, and a color space converting section 154b, and subjects frame data read from a second frame buffer 52 to format conversion, bit extension processing, scaling processing, and color space conversion.

The format converting/bit extending sections 150a and 150b read various kinds of format information of the frame buffers, and convert a data format to extend the data format to a bit length used in processing in the subsequent stage.

The scaling processing sections 152a and 152b enlarge and reduce the frame images according to the size of the display, and improve image quality using a bilinear filter or the like.

The color space converting sections 154a and 154b convert the color space of the frames according to the specifications of the display. The color space converting sections 154a and 154b for example convert the frame data to a pixel format such as RGB, YCbCr, or the like.

An alpha blending section 156 generates a composite image by subjecting the inputs of the frame data after the conversion in the path a and the frame data after the conversion in the path b to alpha blending, and outputs the composite image to an MIPI (Mobile Industry Processor Interface) interface section 158. The MIPI interface section 158 outputs the image received from the alpha blending section 156 as final screen data to the panel.

FIG. 4 shows a configuration example assuming the inputs of frame data from two frame buffers. When three or more frame buffers are to be supported, it suffices to provide three or more configurations each including the format converting/bit extending section 150a, the scaling processing section 152a, and the color space converting section 154a enclosed by the dotted line 160a in parallel with each other, and form the alpha blending section 156 as a multiple-input single-output configuration that receives and synthesizes inputs from three or more paths.

The DISPC 60 is provided with a writing-back path 64 for transfer for extracting the generated screen image as a screen image for transfer. The outputs of the path a and the path b, that is, the screen images after the frame data from the frame buffers is subjected to format conversion, bit extension, scaling processing, and color space conversion are extracted as a path a output (path a-out) and a path b output (path b-out). In addition, the output of the path c, that is, the screen image after the output of the path a and the output of the path b are subjected to alpha blending is extracted as a path c output (path c-out). The screen images as the path a output, the path b output, and the path c output are written back as screen images for transfer to the dedicated memory 70 via the dedicated path 62 in the implementation example of FIG. 3A or via the system interconnect 40 in the implementation example of FIG. 3B.

Because the screen images as the path a output and the path b output are written back to the dedicated memory 70 via the dedicated path 62 or the system interconnect 40, the screen images before the synthesis of the two screens can be extracted individually. Because the path c output is written back to the dedicated memory 70 via the dedicated path 62 or the system interconnect 40, the screen image after the synthesis of the two screens can be extracted.

Figure 5A:
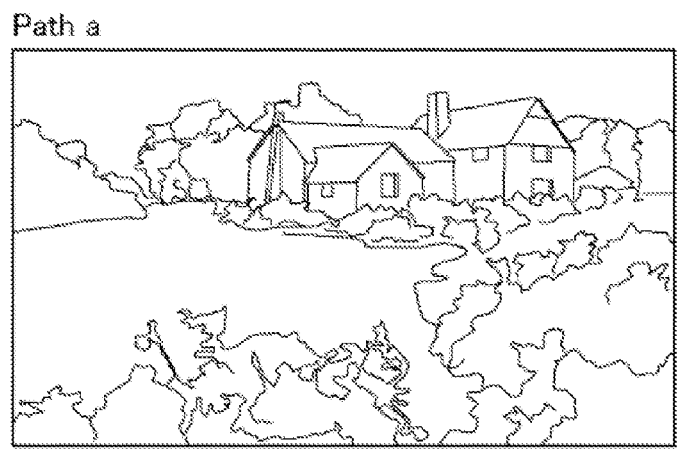
FIGS. 5A to 5C are diagrams of assistance in explaining screen images extracted from the display controller using a writing-back path for transfer.
Figure 5B:
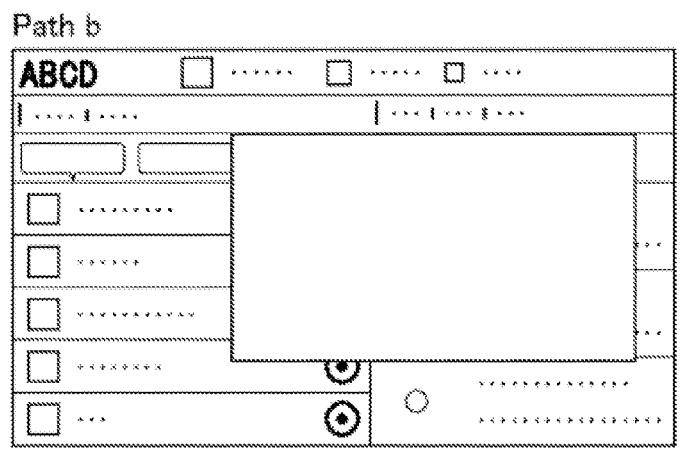
Figure 5C:
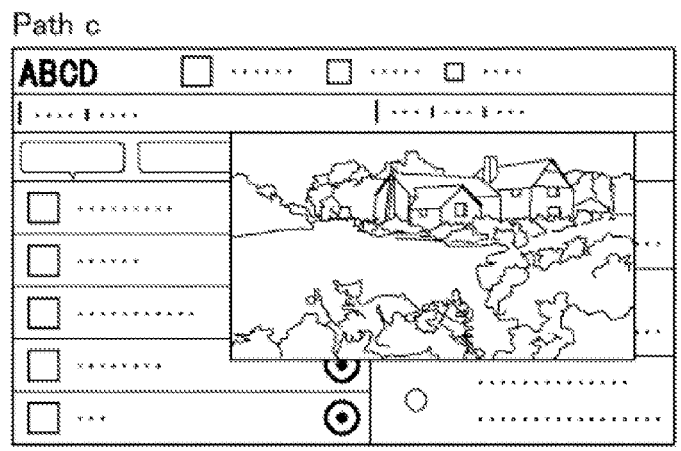

FIGS. 5A to 5C are diagrams of assistance in explaining screen images extracted from the DISPC 60 using the writing-back path 64 for transfer.

FIG. 5A shows the screen image as the path a output, which is a moving image stream in this case. FIG. 5B shows the screen image as the path b output, which is a menu screen or a game screen in this case. FIG. 5C shows the screen image as the path c output, which is an image obtained by synthesizing the menu screen as the path b output with the moving image as the path a output in this case. These three kinds of screen images can be extracted by using the writing-back path 64 for transfer of the DISPC 60.

Description will be made of a few examples of uses of the three kinds of screen images extracted as screen images for transfer. As a first use example, the composite image as the path c output is displayed on the display panel of the screen transmitting system having the screen transfer function 200, and the same screen image is transferred to the screen receiving system having the AVC decoder 400. This method is used, for example, when the screen is desired to be shared between the transmitting side and the receiving side, or when the screen on the transmitting side is desired to be viewed on the large screen display on the receiving side.

As a second use example, the composite image as the path c output is displayed on the display panel of the screen transmitting system, and the moving image stream as the path a output is transferred to the image receiving system. This method is suitable for example when the menu screen is desired to be displayed on the mobile apparatus 100 on the transmitting side and operated at hand while a movie is viewed on the large screen display. The menu screen may be separately generated and displayed on the screen receiving system without being displayed on the mobile apparatus 100 on the transmitting side.

As a third use example, the composite screen as the path c output is displayed on the display panel of the screen transmitting system, the screen as the path a output is transferred to one of two screen receiving systems, and the screen as the path b output is transferred to the other screen receiving system. For example, a moving image can be displayed on the display of the one screen receiving system, and a game screen can be displayed on the display of the other screen receiving system.

As a fourth use example, no path output image is displayed on the display panel of the screen transmitting system, and the composite image as the path c output is transferred to the screen receiving system. This method is used for example when the screen viewed on the mobile apparatus 100 on the transmitting side is desired to be switched to and viewed on the large screen of the TV/monitor 300 on the receiving side.

While FIG. 4 shows the configuration of the DISPC 60 having one channel of image output, two channels of image output may be provided. FIG. 6 is a diagram of assistance in explaining a configuration of the DISPC 60 provided with two channels of image output. The configuration of a first channel CH1 (reference numeral 162) and the configuration of a second channel CH2 (reference numeral 164) are each the same as in FIG. 4. As also shown in FIG. 2, in a normal use, the final screen data of the first channel CH1 is supplied to the LCD/OLED panel 230, while the final screen data of the second channel CH2 is supplied to the HDMI/MHL connector 260 to be displayed on a monitor or the like connected to the HDMI/MHL connector 260 by HDMI/MHL.

Also in the DISPC 60 of FIG. 6, paths path a-out and path b-out for extracting images before alpha blending in the path a and path b of the first channel CH1 and a path path c-out for extracting a composite image after alpha blending in the path c of the first channel CH1 are provided for the first channel CH1. In addition, paths path a-out and path b-out for extracting images before alpha blending in the path a and path b of the second channel CH2 and a path path c-out for extracting a composite image after alpha blending in the path c of the second channel CH2 are provided for the second channel CH2. As in FIG. 4, these screen images as path outputs are written back as screen images for transfer to the dedicated memory 70 via the dedicated path 62 in the implementation example of FIG. 3A or via the system interconnect 40 in the implementation example of FIG. 3B.

When the DISPC 60 having the two output channels in FIG. 6 is used, two kinds of screen images can be generated, then extracted as screen images for transfer from a writing-back path 65 for transfer (path a-out, path b-out, and path c-out), and transferred to an apparatus as a transfer destination.

Figure 7A:
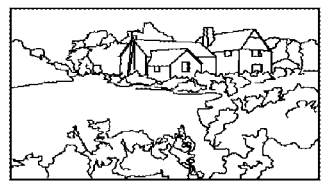
FIGS. 7A to 7C are diagrams of assistance in explaining an example of a use of the display controller having the two output channels.
Figure 7B:
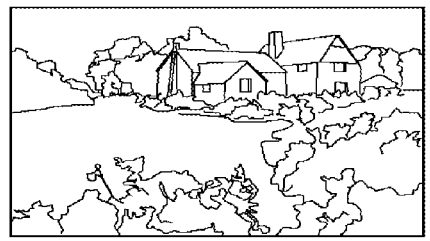
Figure 7C:
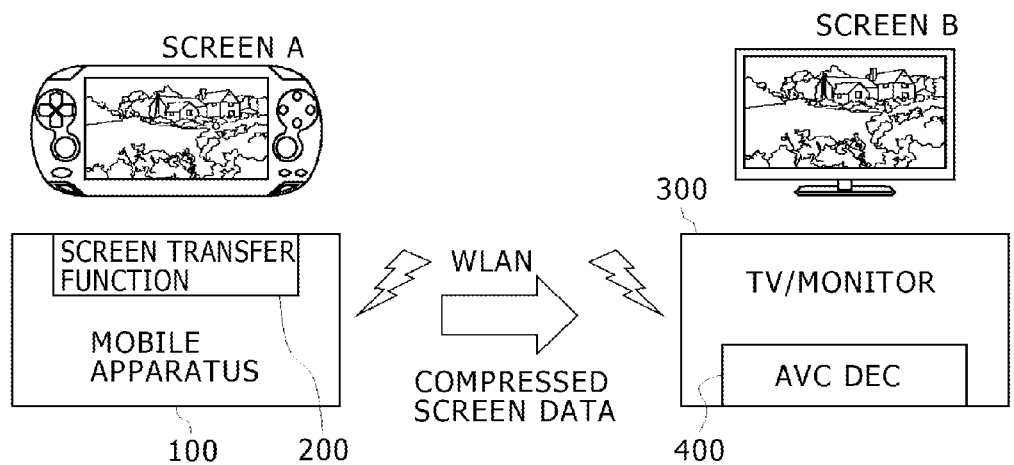

FIGS. 7A to 7C are diagrams of assistance in explaining an example of a use of the DISPC 60 having the two output channels. On the first channel CH1, a screen A of a low resolution of 1280 pixels wide by 720 pixels high as shown in FIG. 7A is generated as a screen for the mobile apparatus 100 on the transmitting side. Meanwhile, on the second channel CH2, a screen B of a high resolution of 1980 pixels wide by 1080 pixels high as shown in FIG. 7B is generated as a screen for the TV/monitor 300 on the receiving side. The screen on the first channel CH1 is updated according to the refresh rate of the panel of the mobile apparatus 100. The screen on the second channel CH2 is updated according to the refresh rate of the TV/monitor 300.

As shown in FIG. 7C, the screen A on the first channel CH1 of the DISPC 60 is output to the display panel of the mobile apparatus 100 on the transmitting side, while the screen B on the second channel CH2 is extracted as a screen image for transfer from the writing-back path for transfer, compression-coded, and thereafter transferred to the TV/monitor 300 as a transfer destination. The TV/monitor 300 receives the compression-coded screen image, decodes the compression-coded screen image by the AVC decoder 400, and displays the screen image on the display. Thereby, the screen A of low resolution is displayed on the mobile apparatus 100 on the transmitting side, and the screen B of high resolution is displayed on the TV/monitor 300 on the receiving side. However, the screen A may be undisplayed when the screen A does not need to be displayed on the mobile apparatus 100 on the transmitting side.

When the DISPC 60 having the two output channels is thus used, the screens that show a same image but are different from each other in resolution and refresh rate can be generated. It is therefore possible to output the low-resolution screen directly to the mobile apparatus 100, while transferring the high-resolution screen to the TV/monitor 300 and displaying the high-resolution screen on the TV/monitor 300. As compared with a method in related art in which two frame buffers for different resolutions are provided, the present embodiment can generate two screen images different from each other in resolution and refresh rate without increasing an amount of occupied memory or a CPU load.

Figure 8A:
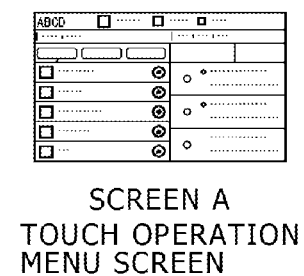
FIGS. 8A to 8C are diagrams of assistance in explaining another example of a use of the display controller having the two output channels.
Figure 8B:
Figure 8C:
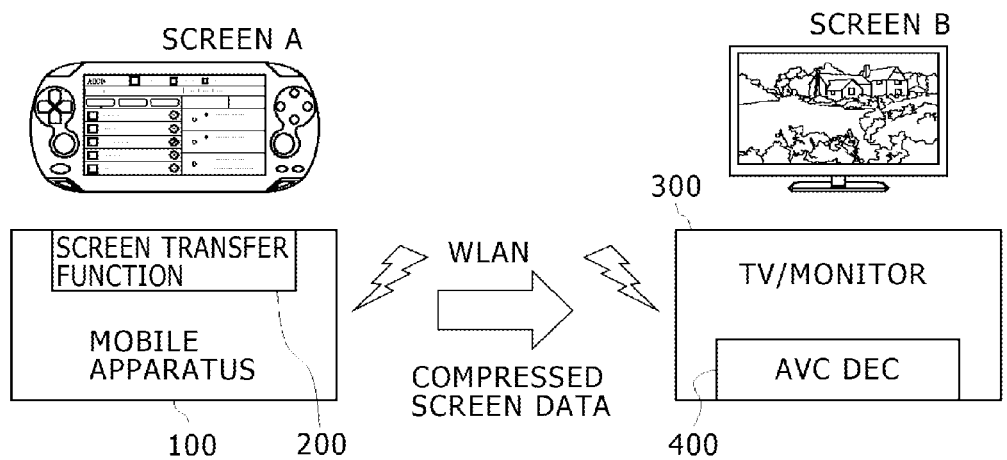

FIGS. 8A to 8C are diagrams of assistance in explaining another example of a use of the DISPC 60 having the two output channels. On the first channel CH1, a screen A of a touch operation menu shown in FIG. 8A is generated as a screen for the mobile apparatus 100 on the transmitting side. Meanwhile, on the second channel CH2, a screen B of game video shown in FIG. 8B is generated as a screen for the TV/monitor 300 on the receiving side. The screen on the first channel CH1 is updated according to the refresh rate of the panel of the mobile apparatus 100. The screen on the second channel CH2 is updated according to the refresh rate of the TV/monitor 300.

As shown in FIG. 8C, the screen A on the first channel CH1 of the DISPC 60 is output to the display panel of the mobile apparatus 100 on the transmitting side, while the screen B on the second channel CH2 is extracted as a screen image for transfer from the writing-back path for transfer, compression-coded, and thereafter transferred to the TV/monitor 300 as a transfer destination. The TV/monitor 300 receives the compression-coded screen image, decodes the compression-coded screen image by the AVC decoder 400, and displays the screen image on the display. Thereby, the screen A of the touch operation menu is displayed on the mobile apparatus 100 on the transmitting side, and the screen B of the game video is displayed on the TV/monitor 300 on the receiving side.

When the DISPC 60 having the two output channels is thus used, different screens can be generated. Therefore, the screen of the touch operation menu can be output directly to the mobile apparatus 100 to be operated at hand, while the screen of the game video can be transferred to the TV/monitor 300 to be displayed on the large screen.

Figure 9A:
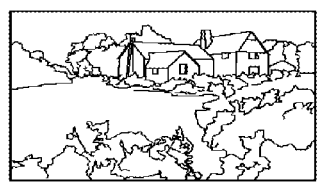
FIGS. 9A to 9C are diagrams of assistance in explaining yet another example of a use of the display controller having the two output channels.
Figure 9B:
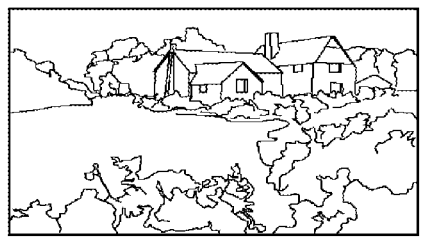
Figure 9C:
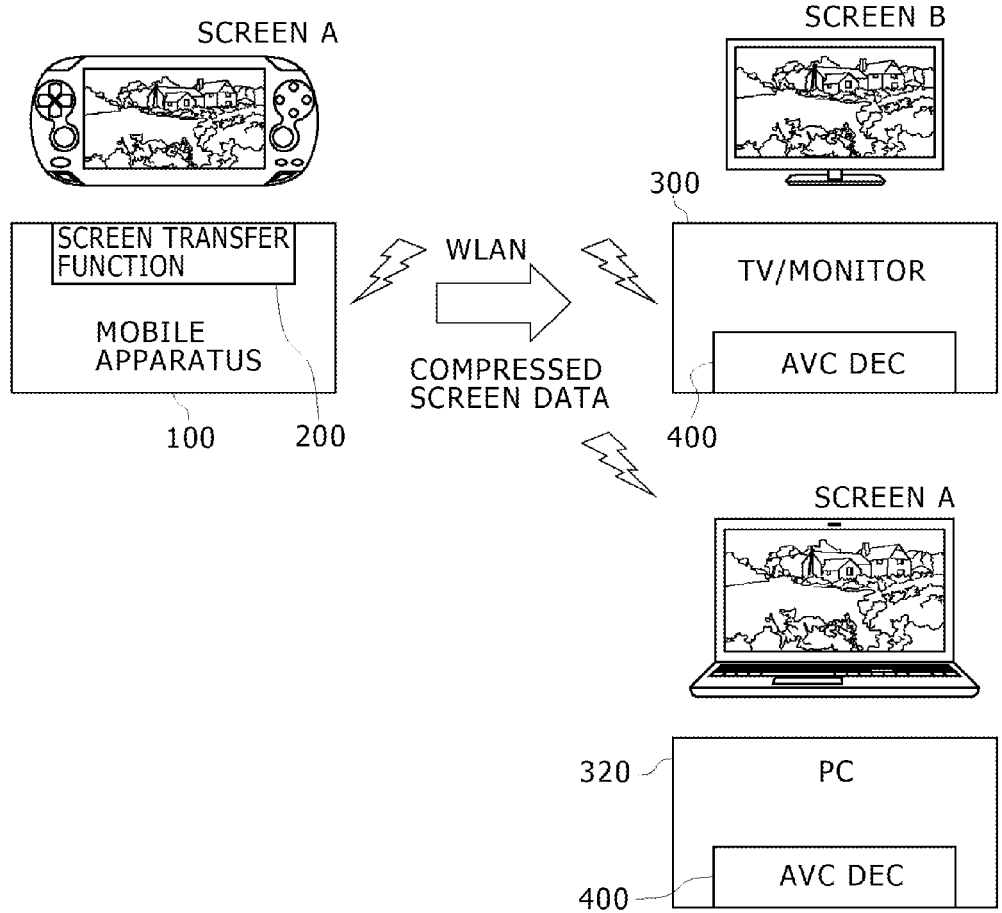

FIGS. 9A to 9C are diagrams of assistance in explaining yet another example of a use of the DISPC 60 having the two output channels. On the first channel CH1, a screen A of a low resolution of 1280 pixels wide by 720 pixels high as shown in FIG. 9A is generated as a screen for the mobile apparatus 100 on the transmitting side. Meanwhile, on the second channel CH2, a screen B of a high resolution of 1980 pixels wide by 1080 pixels high as shown in FIG. 9B is generated as a screen for the TV/monitor 300 and a personal computer 320 on the receiving side.

As shown in FIG. 9C, the screen A on the first channel CH1 of the DISPC 60 is output to the display panel of the mobile apparatus 100 on the transmitting side, while the screen B on the second channel CH2 is extracted as a screen image for transfer from the writing-back path for transfer, compression-coded, and thereafter transmitted to the TV/monitor 300 and the personal computer 320 as transfer destinations. The TV/monitor 300 and the personal computer 320 receive the compression-coded screen image, decode the compression-coded screen image by the AVC decoder 400, and display the screen image on the display. Thereby, the screen A of low resolution is displayed on the mobile apparatus 100 on the transmitting side, and the screen B of high resolution is displayed on the TV/monitor 300 and the personal computer 320 on the receiving side. However, the screen A may be undisplayed when the screen A does not need to be displayed on the mobile apparatus 100 on the transmitting side.

When the DISPC 60 having the two output channels is thus used, the screens that show a same image but are different from each other in resolution and refresh rate can be generated. It is therefore possible to output the low-resolution screen directly to the mobile apparatus 100, while transferring the high-resolution screen to the TV/monitor 300 and the personal computer 320 and displaying the high-resolution screen on the TV/monitor 300 and the personal computer 320. Transferring the high-resolution screen to the plurality of receiving systems enables a plurality of users to share the same screen.

FIG. 10 is a flowchart of assistance in explaining a procedure for software handshaking between the screen transmitting system and the screen receiving system.

The screen transmitting system transmits a screen connection request to the screen receiving system (S10). The screen connection request includes, as attached information, screen contents indicating a type of video such as a game, a movie, or the like, a resolution, a refresh rate, an AVC compression format, the presence or absence of audio, an audio format, an inquiry about the presence or absence of user input in the screen receiving system, and the like.

The screen transmitting system prepares video transfer by initializing the DISPC 60, the AVC encoder 80, and the I/O 90, prepares audio transfer, and prepares TCP/IP and UDP (User Datagram Protocol) (S12).

Receiving the screen connection request, the screen receiving system initializes the AVC decoder 400 and the I/O 90, prepares audio processing, prepares the transfer of user input, and prepares TCP/IP and UDP (S14). The screen receiving system returns a screen connection acknowledgement to the screen transmitting system (S16). The screen connection acknowledgement includes the presence or absence of user input as attached information. Description in the following will be made of a case where there is user input. The screen transmitting system prepares to receive the user input from the screen receiving system (S18).

The screen receiving system transmits a notification of a connection OK to an effect that the initialization is completed and that the screen receiving system is ready to receive a transferred screen to the screen transmitting system (S20). The screen transmitting system confirms the completion of preparation for screen transfer (S22), and transmits a connection start notification to an effect that the initialization is completed and that screen transfer is to be started to the screen receiving system (S24).

The screen transmitting system and the screen receiving system transmit and receive data by UDP connectionless communication in TCP/IP (S26 to S29). The screen transmitting system transmits the screen and audio to the screen receiving system, and receives the user input from the screen receiving system (S30). The screen receiving system receives the screen and audio from the screen transmitting system, and transmits the user input to the screen transmitting system (S32).

According to the screen transfer system according to the present embodiment, a screen image can be transferred in real time from a certain apparatus to another apparatus. In addition, because user input in the apparatus as the transfer destination is transferred to the apparatus as the transfer source, the apparatus as the transfer source can generate the screen image reflecting the user input, and transfer the updated screen image to the apparatus as the transfer destination. Thus, the user input is reflected on the transferred screen in real time, and response is not degraded even when the user uses the apparatus as the transfer destination.

By providing the path for extracting a screen image for transfer from the display controller and writing back the screen image for transfer to the dedicated memory, the screen image can be transferred to the apparatus as the transfer destination with low latency. In addition, by providing the dedicated data path for screen transfer processing separately from the system interconnect, a situation can be avoided in which the screen transfer processing and the ordinary processing contend with each other for system resources, and consequently the behavior of an application changes or screen transfer is delayed.

Particularly when a system load at a time of screen transfer is increased, an unpredictable change occurs in the behavior of software, and a development cost for stabilizing the behavior of the software is increased. In addition, the user does not desire that screen transfer makes the operation of the application slow or decrease screen update frequency. In the present embodiment, such a situation is avoided by separating the screen transfer processing and the ordinary processing from each other by the dedicated paths or QoS control.

In addition, because the screen image for transfer is coded by using standard compression coding and then transferred, the screen image can be decoded and displayed by merely incorporating an ordinary decoder into the screen receiving system. The use of compression coding that does not perform inter-frame prediction, in particular, enables a processing time taken for the coding to be reduced, and enables the screen image to be transferred without a delay.

The present technology has been described above on the basis of embodiments thereof. The embodiments are illustrative, and it is to be understood by those skilled in the art that combinations of constituent elements and processing processes of the embodiments are susceptible of various modifications and that such modifications also fall within the scope of the present technology.

The present disclosure contains subject matter related to that disclosed in Japanese Priority Patent Application JP 2013-121131 filed in the Japan Patent Office on Jun. 7, 2013, the entire content of which is hereby incorporated by reference.

What is claimed is:

1. A screen transfer device comprising:
   a main memory including a frame buffer;
   a display controller configured to read frame data from the frame buffer, and generate a screen output image to be displayed on a display;
   a dedicated memory disposed separately from the main memory; and
   a system interconnect configured to interconnect the main memory, the display controller, and the dedicated memory with each other;
   a path being provided for extracting the screen output image as a screen image for transfer to be transferred to another apparatus from the display controller, and writing back the screen image for transfer to the dedicated memory without the screen image for transfer passing through the system interconnect.

2. The screen transfer device according to claim 1, further comprising
   an encoder configured to compression-code the screen image for transfer;
   a path being provided for the encoder to read the screen image for transfer from the dedicated memory without the screen image for transfer passing through the system interconnect, and write back the compression-coded screen image for transfer to the dedicated memory without the compression-coded screen image for transfer passing through the system interconnect.

3. The screen transfer device according to claim 2, further comprising
   an input-output section configured to output the compression-coded screen image for transfer to an outside;
   a path being provided for the input-output section to read the compression-coded screen image for transfer from the dedicated memory without the compression-coded screen image for transfer passing through the system interconnect.

4. The screen transfer device according to claim 1, wherein the display controller reads frame data from a plurality of frame buffers, generates screen images in a plurality of paths, and synthesizes the screen images into a final screen output image, and a path is provided for extracting each of the screen images generated in the respective paths and the synthesized final screen output image as the screen image for transfer from the display controller, and writing back the screen image for transfer to the dedicated memory without the screen image for transfer passing through the system interconnect.

5. The screen transfer device according to claim 1, wherein the display controller has two channels of screen output, and generates two kinds of screen output images, one screen output image is output to a display panel connected to the display controller, and the other screen output image is extracted as the screen image for transfer.

6. The screen transfer device according to claim 5, wherein the two kinds of screen output images are screen output images different from each other in resolution or refresh rate.

7. The screen transfer device according to claim 5, wherein one of the two kinds of screen output images is an operating screen.

8. The screen transfer device according to claim 1, wherein the dedicated memory is shared between screen transfer processing and downward compatible processing.

9. A screen transfer method for transferring a screen image in a device, the device including a main memory, a display controller, and a dedicated memory interconnected with each other by a system interconnect, the method comprising:

reading frame data from a frame buffer included in the main memory, and generating a screen output image to be displayed on a display by the display controller;

extracting the screen output image as a screen image for transfer to be transferred to another apparatus from the display controller, and writing back the screen image for transfer to the dedicated memory without the screen image for transfer passing through the system interconnect; and compression-coding the screen image for transfer, the screen image for transfer being written back to the dedicated memory, and transferring the screen image for transfer to the other apparatus.

* * * * *